United States Patent
Sun

(10) Patent No.: US 6,542,849 B2
(45) Date of Patent: Apr. 1, 2003

(54) METHOD FOR DETERMINING DEFECT DEPTH USING THERMAL IMAGING

(75) Inventor: Jiangang Sun, Westmont, IL (US)

(73) Assignee: The University of Chicago, Chicago, IL (US)

( * ) Notice: Subject to any disclaimer, the term of this patent is extended or adjusted under 35 U.S.C. 154(b) by 11 days.

(21) Appl. No.: 09/766,214

(22) Filed: Jan. 19, 2001

(65) Prior Publication Data

US 2002/0128797 A1 Sep. 12, 2002

(51) Int. Cl.⁷ .............................................. G01B 11/02
(52) U.S. Cl. ...................................... 702/172; 702/170
(58) Field of Search ......................... 356/237; 364/507; 374/4, 5; 702/172, 170, 166, 155

(56) References Cited

U.S. PATENT DOCUMENTS

| | | | |
|---|---|---|---|
| 4,826,326 A | * 5/1989 | Reynolds et al. | 374/5 |
| 5,689,332 A | * 11/1997 | Ellingson et al. | 356/237 |
| 5,711,603 A | 1/1998 | Ringermacher et al. | |
| 6,285,449 B1 | * 9/2001 | Ellingson et al. | 356/237.1 |

OTHER PUBLICATIONS

"Front Flash Thermal Imaging Characterization of Continuous Fiber Ceramic Composites" by C. Deemer, J.G.Sun, W.A.Ellingson, and S. Short, 23rd Annual Cocoa Beach Int. Conf. On Engineering Ceramics and Structures, Jan. 25–29, 1999.

"Early Time Pulse Echo Thermal Wave Imaging" by Han et al., Review of Progress in Quantitative Nondestructive Evaluation, vol. 15, pp. 519–524, 1996.

"Nondestructive Evaluation of Materials by Infrared Thermography" by X. Maldague, Springer–Verlag, London, 1993.

"Pulse phase infrared thermography" by X. Maldague et al., J. Appl. Phys., 79(5), pp. 2694–2698, 1996.

Flash Method of Determining Thermal Diffusivity, heat capacity, and Thermal Conductivity, by Parker et al., J. Appl. Phys., 32:1679–1684, 1861.

Thermal Imaging Measurement and Correlation of Thermal Diffusivity in Continuous Fiber, by J.G. Sun et al., Thermal Conductivity 24, eds, P.S. Gaal and D.E. Apostolescu, pp. 616–622, 1999.

* cited by examiner

Primary Examiner—John Barlow
Assistant Examiner—Douglas N Washburn
(74) Attorney, Agent, or Firm—Joan Pennington

(57) ABSTRACT

A method and apparatus are provided for determining the thickness of a sample and defect depth using thermal imaging in a variety of plastic, ceramic, metal and other products. A pair of flash lamps is positioned at a first side of the sample. An infrared camera is positioned near the first side of the sample. A data acquisition and processing computer is coupled to the flash lamps for triggering the flash lamps. The data acquisition and processing computer is coupled to the infrared camera for acquiring and processing thermal image data. The thermal image data are processed using a theoretical solution to analyze the thermal image data to determine the thickness of a sample and defect depth.

13 Claims, 4 Drawing Sheets

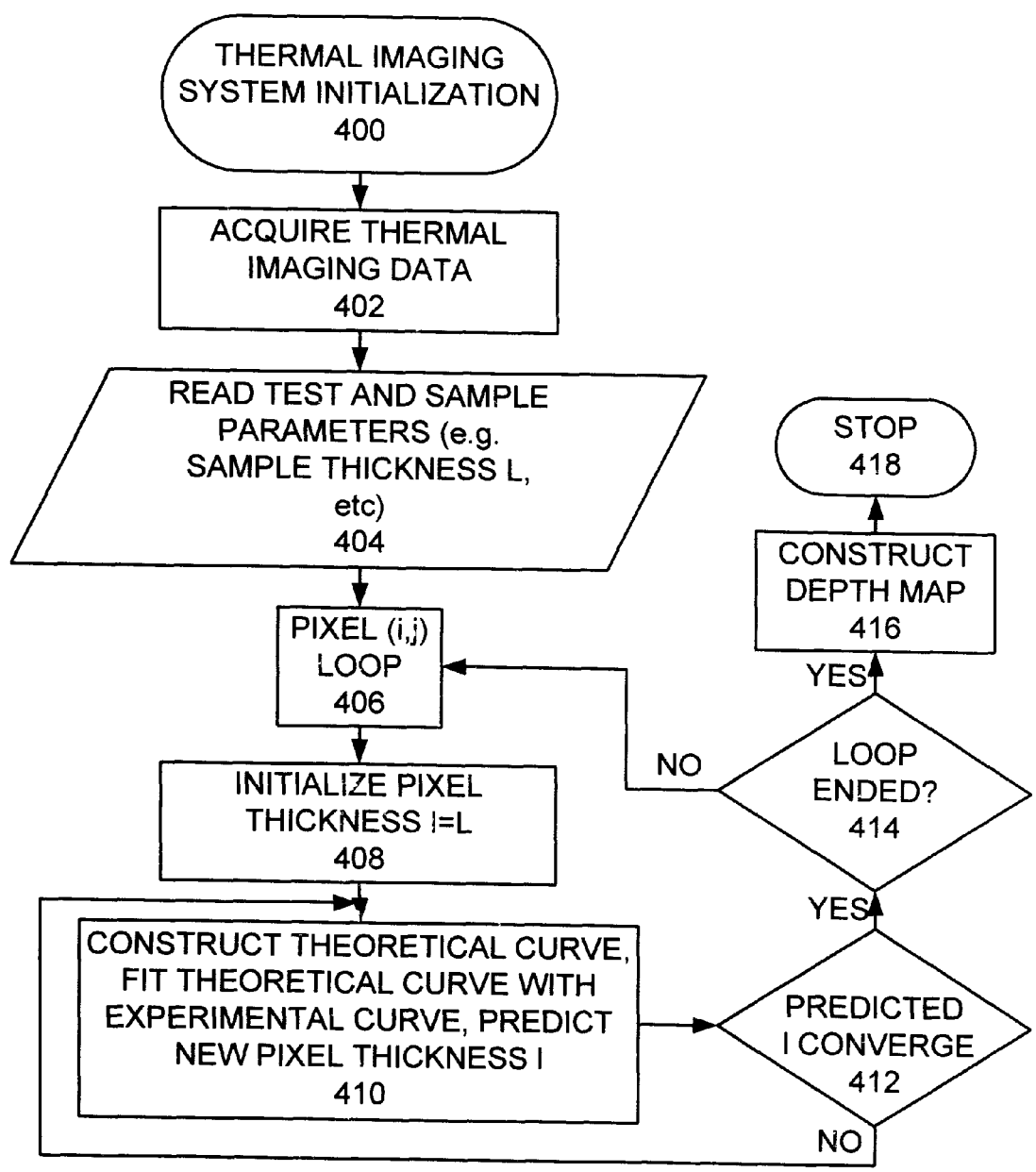

METHOD FOR DETERMINING DEFECT DEPTH USING THERMAL IMAGING

The United States Government has rights in this invention pursuant to Contract No. W-31-109-ENG-38 between the United States Government and Argonne National Laboratory.

FIELD OF THE INVENTION

The present invention relates to a method and apparatus for determining the location of defects, such as cracks in various products, such as multiplayer laminates for small aircraft, boats and the like; and more particularly, relates to a method and apparatus for determining the thickness of a sample and defect depth using thermal imaging in a variety of plastic, ceramic, metal and other products.

DESCRIPTION OF THE RELATED ART

Determining defect depth with thermal imaging or thermography has received extensive study from researchers in academia and industry for many years. Traditional thermograph techniques have involved manual examination of acquired thermal images to identify defects. The operator must proceed through a series of thermal images taken within a specific time period to look for hot spots and assess their contrast against the surroundings in order to estimate their relative depths. This process is very time consuming and provides only qualitative data.

Non-destructive testing using transient thermography which relies upon the transfer of heat through an object over a period of time is known in the art. For example, U.S. Pat. No. 5,711,603, issued Jan. 27, 1998 to Ringermacher et al. and entitled "NONDESTRUCTIVE TESTING:TRANSIENT DEPTH THERMOGRAPHY" discloses a non-destructive testing technique and system using transient depth thermography. The disclosed method requires the construction of a reference temperature/time curve from the average temperatures of the entire images. As a result, sample heating must be uniform during the experiment, which is difficult to achieve in large samples, and the sample must have a uniform thickness. The disclosed method uses a six point average scheme to calculate the derivative of temperature contrast in order to suppress the high signal noise due to data subtraction and differentiation operations. This smoothing scheme may significantly reduce the accuracy of the predicted depth. Predicted depth is expressed as a relative depth to the sample thickness and is not an absolute value of depth. These problems make the disclosed method less accurate and less useful for general applications.

A principal object of the present invention is to provide a method and apparatus for determining the thickness of a sample and defect depth using thermal imaging in a variety of plastic, ceramic, metal and other products.

It is another object of the invention to provide such thermal imaging method and apparatus for determining the thickness of a sample and defect depth that accurately provides defect depth.

It is another object of the invention to provide such thermal imaging method and apparatus for determining the thickness of a sample and defect depth that allows for testing a variety of surfaces.

It is another object of the invention to provide such thermal imaging method and apparatus for determining the thickness of a sample and defect depth that preferably uses one-sided thermal imaging where the source of heat energy and an infrared camera or other sensing equipment are on the same side of the sample.

It is another object of the invention to provide such thermal imaging method and apparatus for determining the thickness of a sample and defect depth substantially without negative effect and that overcome many of the disadvantages of prior arrangements.

SUMMARY OF THE INVENTION

In brief, a method and apparatus are provided for determining the thickness of a sample and defect depth using thermal imaging in a variety of plastic, ceramic, metal and other products. A pair of flash lamps is positioned at a first side of the sample. An infrared camera is positioned near the first side of the sample. A data acquisition and processing computer is coupled to the flash lamps for triggering the flash lamps. The data acquisition and processing computer is coupled to the infrared camera for acquiring and processing thermal image data. The thermal image data are processed using a theoretical solution to analyze the thermal image data to determine the thickness of a sample and defect depth.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 is a flow chart illustrating exemplary steps of a method for determining the thickness of a sample and the location and defect depth in accordance with the preferred embodiment.

DETAILED DESCRIPTION OF THE PREFERRED EMBODIMENTS

Figure 1:
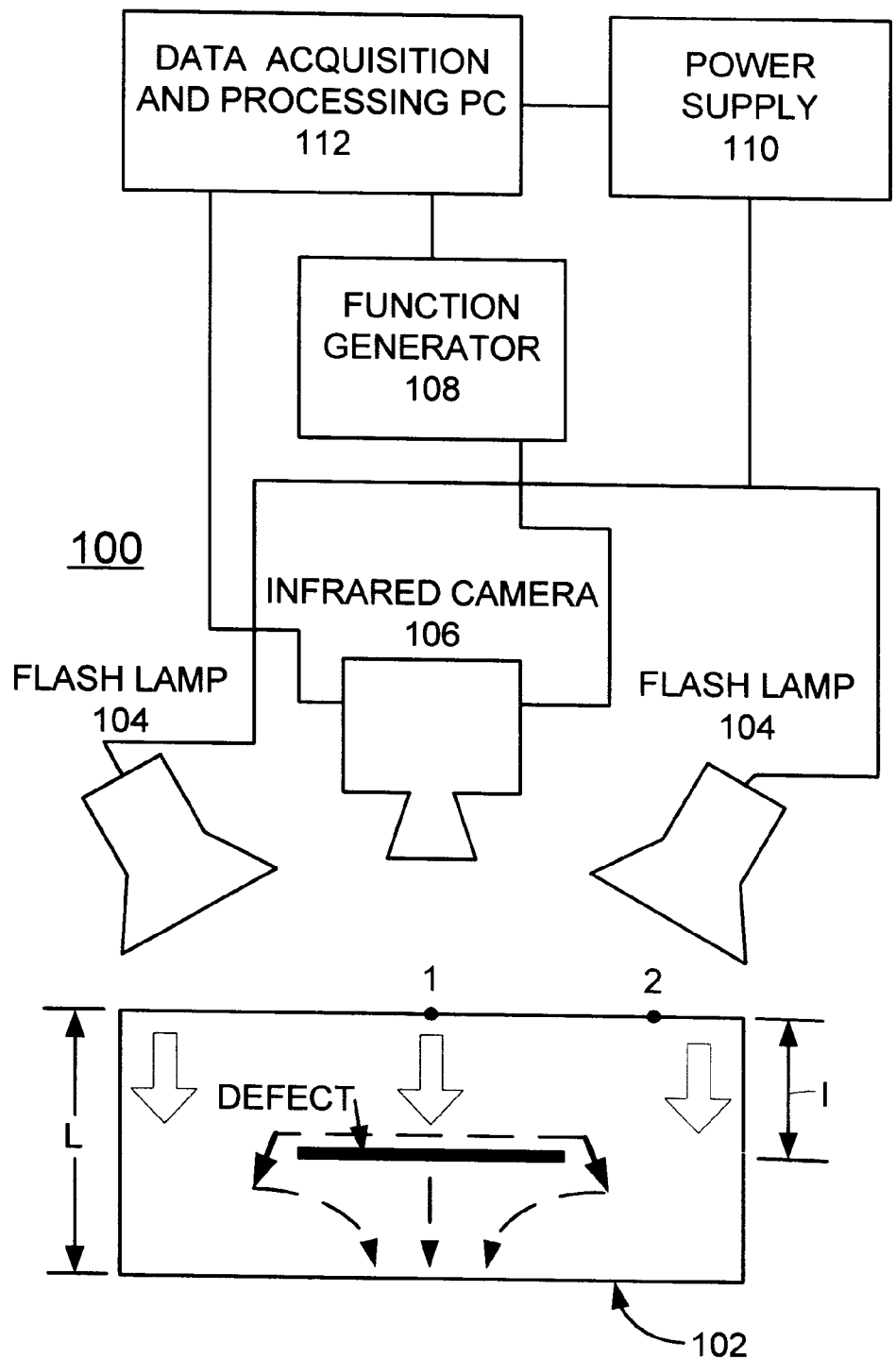
FIG. 1 is a diagram illustrating a thermal imaging apparatus for implementing a method for determining the thickness of a sample and the location and defect depth in accordance with the preferred embodiment.

Having reference now to the drawings, FIG. 1 illustrates a thermal imaging apparatus for implementing a method for determining the thickness of a sample 102 and the location and defect depth in accordance with the preferred embodiment and generally designated by the reference numeral 100. Thermal imaging system 100 includes a pair of flash lamps 104, each for providing a pulse of thermal energy for heating a first surface of the sample 102. Thermal imaging system 100 includes a high-resolution and high-sensitivity infrared camera 106, for example, with 256×256 pixel focal plane array of infrared sensors. Infrared camera 106 is positioned on the same side of the sample 102 as the flash lamps 104. A function generator 108 coupled to the infrared camera 106 to control the infrared camera and a power supply 110 associated with the flash lamps 104 are operatively controlled by a data acquisition and processing personal computer 112.

Data acquisition and processing personal computer 112 is suitably programmed to execute the flow chart of FIG. 4 in accordance with the preferred embodiment.

FIG. 1 illustrates the sample 102 with a lateral crack or defect labeled DEFECT and has an overall thickness indicated by the line labeled L and a defect depth indicated by the line labeled I. When pulsed thermal energy is applied, for example, with flash lamps 104, a thin layer of material on the surface will be instantaneously heated to a high temperature. Heat transfer then takes place from the heated surface to the interior of the sample, resulting in a continuous decrease of the surface temperature. If a lateral crack, in which the crack plane is parallel to the sample surface, which is filled with air and is more resistant to heat transfer, exists in the sample 102, the heat transfer rate is reduced, resulting in a higher surface temperature at this region than in the surrounding areas, or is seen as a local hot spot. The hot spot appears earlier during the transient if the crack is shallow or later if the crack is deep. FIG. 1 illustrates this heat transfer process.

Figure 2A:
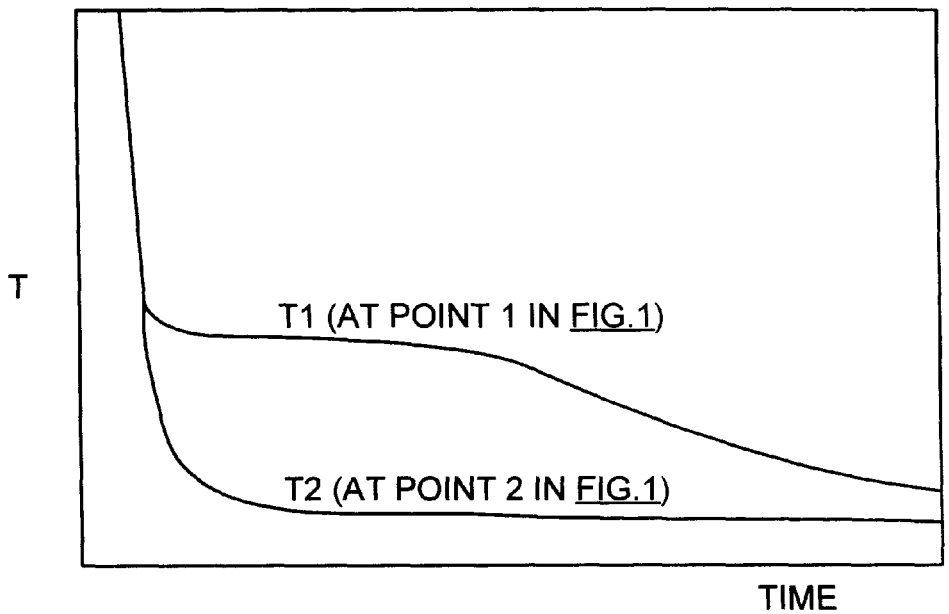
FIGS. 2A, 2B, and 2C are charts illustrating a peak contrast derivative time method for determining defect depth.
Figure 2B:
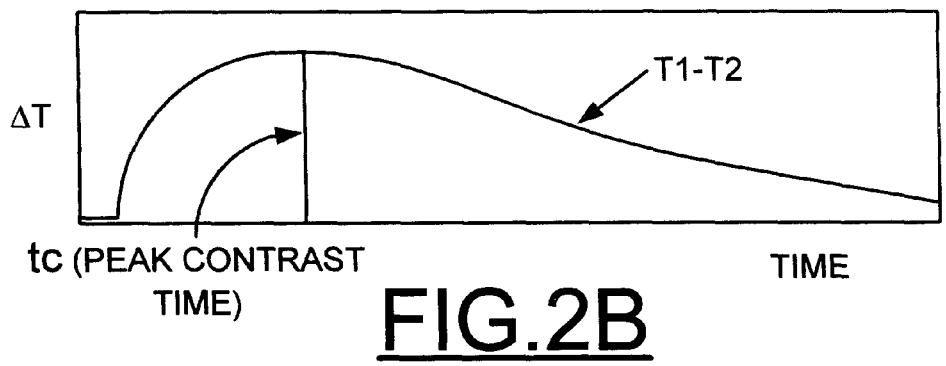
Figure 2C:
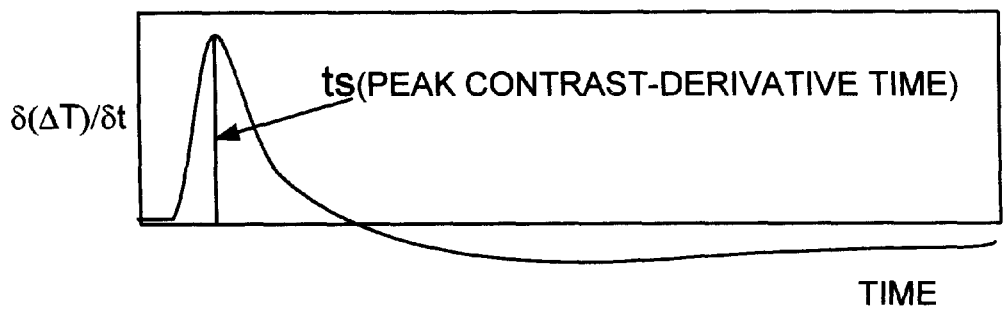

Referring also to FIGS. 2A, 2B, and 2C, in FIG. 2A, the temperature variations at surface points 1 and 2 of sample 102 in FIG. 1 are illustrated, where point 1 is a region with a subsurface lateral crack and point 2 is at a normal area. The temperature at point 1, T1 is always higher but eventually approaches the temperature at point 2, T2, because heat transfer around and through the crack as shown in FIG. 1 will eventually equalize the sample temperature. The temperature difference ΔT(T1−T2) is shown in FIG. 2B which shows a peak contrast time tc. The derivative of ΔT is shown in FIG. 2C. FIG. 2C illustrates a peak derivative time ts. One known correlation between ts and the defect depth is represented by:

$$ts = (3.64 \ast l^2)/\pi^2 \alpha \qquad (1)$$

where α is the through-thickness thermal diffusivity. This equation gives the relative defect depth at point 1, once the peak derivative time ts is determined from FIG. 2C. The calculation can be carried out for all other surface points by using the temperature/time curve at point 2 as a reference. The final results of predicted relative defect depths for all surface points can be presented as a 2-dimensional depth map or image. When applying this method, a major problem has been the prior determination of a reference point that is known on a sound material. This method works when the defect region is small and the surface is uniformly illuminated. Low accuracy of the results occur because the data processing in this method includes subtraction and differentiation of two experimental signals, and both operations increase noise and reduce accuracy. In addition, this method is not applicable if the sample thickness is not uniform or constant.

In accordance with features of the invention, the new method and software accurately determines defect depth or sample thickness using pulse thermal imaging apparatus 100. The method of the present invention differs from conventional method in that it uses a theoretical solution instead of empirical data processing to analyze the thermal imaging data. The method of the present invention is based on the theory of one-dimensional heat transfer in a sample 102 of uniform thickness L. The sample is initially at a temperature of 0; at time t=0, a heat impulse is applied to the sample's surface. The analytical solution of the normalized temperature response on a surface point is represented by:

$$T(t) = \left\{ 1 + 2 \sum_{n=1}^{\infty} \exp((-n^2 \pi^2 / L^2)\alpha t) \right\} \qquad (2)$$

where α is the through-thickness thermal diffusivity, which can be measured separately. This temperature variation is shown in FIG. 2A as the curve T2. For a surface point with a subsurface lateral crack at depth I, its initial temperature variation can also be approximately represent by the above equation, but replacing L by I, as represented by:

$$TA(t) = \left\{ 1 + 2 \sum_{n=1}^{\infty} \exp((-n^2 \pi^2 / l^2)\alpha t) \right\} \qquad (3)$$

Figure 3:
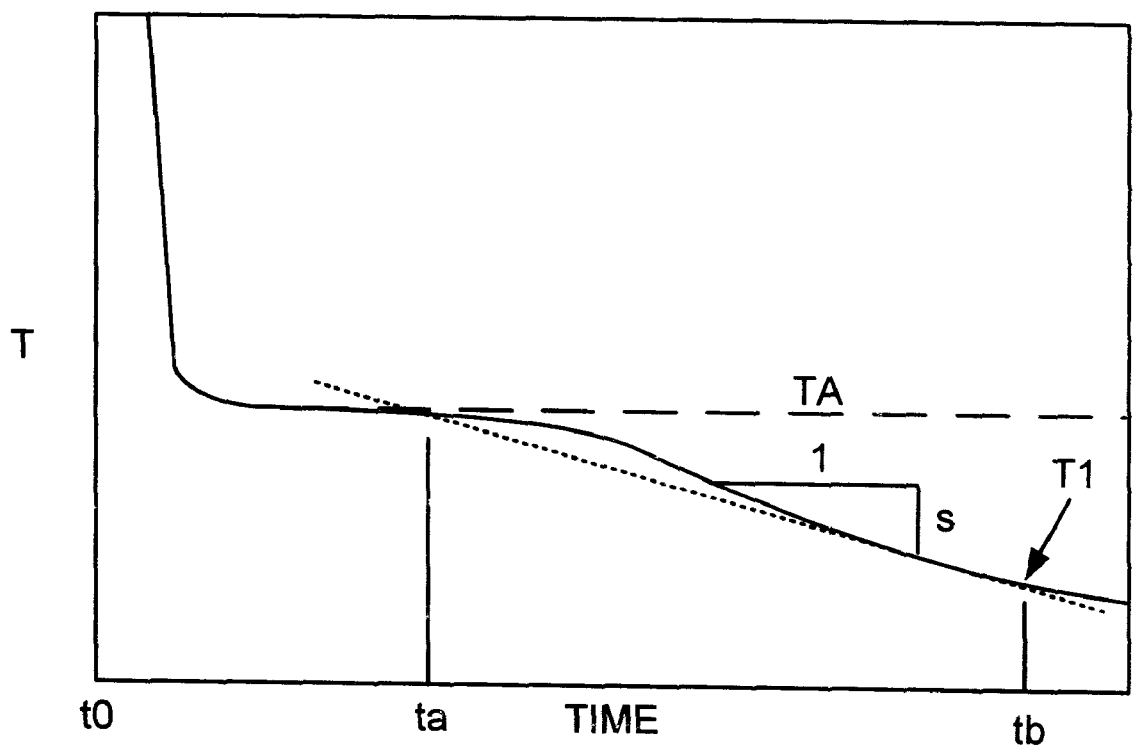
FIG. 3 is a chart illustrating a thermal imaging method for determining defect depth in accordance with the preferred embodiment.

FIG. 3 shows that TA in equation 3 can represent T1 in the time period 0<t<ta. In the time period ta<t<tb, the temperature decrease is approximately linear, due to heat transfer through and around the crack, as illustrated in FIG. 1. The slope s of this linear portion of the curve is dependent on the crack gap thickness and the distance of the point to the crack edge, but does not affect determination of defect depth. At longer times, t>tb, the temperature curve T1 approaches the final steady temperature of the sample. This portion of the temperature curve is not used for depth calculation.

The present invention utilizes the above theoretical models to analyze the thermal imaging data and determine defect depth or sample thickness. More specifically, an analytical expression, for example, equation 2 or equation 3 is constructed and used to fit the experimental temperature curve. As described in the following, the best fit of an analytical expression with the experimental data provides either the sample thickness L or the defect depth I. Least-square curve fitting and Newton iteration techniques are used to fit and update the iterations.

If a surface point is on a sound material without subsurface defect, its normalized temperature variation follows equation 2. The unknown parameters are the amplitude A of the theoretical temperature solution and the sample thickness L. These parameters are determined by least-square curve fitting of equation 2 with the experimental temperature-time data, that is curve T2 in FIG. 2A. With updating of A and L by the Newton iteration technique, the least-square fit converges and gives both the correct temperature amplitude A and sample thickness L.

When a surface point is on a region that contains a subsurface lateral crack, for example, surface point 1 in FIG. 1, the construction of an appropriate theoretical curve requires determining the time scales ta and tb as shown in FIG. 3. The following expressions are used:

$$ta = (l^2/2\alpha) \ tb = 3ta \qquad (4)$$

It should be understood that these expressions may not be unique, but the current computer program is optimized for these expressions. In the time period 0<t<ta, equation 3 is used. In the time period ta<t<tb, the experimental data are linearly fitted to derive the slope s as illustrated in FIG. 3. It should be noted that s is usually very small. Therefore, an analytical temperature solution valid in the time period 0<t<tb is:

$$T(t) = \left\{ 1 + 2 \sum_{n=1}^{\infty} \exp((-n^2 \pi^2 / l^2)\alpha t) \right\} - st \qquad (5)$$

Equation 5 is used to curve-fit the experimental temperature/time data to derive the correct amplitude A and defect depth I with the iteration schemes described above.

Referring to FIG. 4, exemplary method steps for determining the thickness of a sample and the location and defect depth in accordance with the preferred embodiment are shown. Initialization of the thermal imaging system 100 is performed as indicated in a block 400. In operation, the experimental temperature data are obtained by using the pulsed thermal imaging system 100 with thermal imaging data acquired as indicated in a block 402. The surface temperature variation is monitored by the infrared camera 106, with a series of thermal images taken and stored in the data acquisition and processing PC 112 for data processing. Each image contains a 2-dimensional array of pixels. Infrared camera may consist of a focal plane array of 256×256 pixel infrared sensors, each converting the observed infrared energy in a particular wavelength range, for example, 3–5 μm to a digital value within a 12-bit dynamic range, that is signal value between 0 and 4095. By proper normalization of the camera 106, the infrared signal values in the 2-dimensional thermal images are proportional to the surface temperature.

Each frame or thermal image represents a snapshot of the surface temperature at a particular time. The number of total thermal images to be taken is determined by the length of the entire time. The number of total thermal images to be taken is determined by the length of the entire thermal transient period. A characteristic time for the thermal transient is the half rise time $t_{1/2}$, which represents the time when the temperature at the back surface of the sample reaches half of the maximum temperature. This maximum temperature at the back surface is also the final equilibrium temperature of the sample. It is defined as follows:

$$t_{1/2} = (0.139L^2)/\alpha \qquad (6)$$

In practice, the final equilibrium temperature is reached at $4t_{1/2}$. For example, if $4t_{1/2}=1$ second, and the camera is operated at a rate of 100 frames per second, a total of 100 thermal images should be taken; thus, the first frame is at t1=0 s, the second frame at t2=0.01 s, and so on.

Sensitivity of the infrared camera 106 should also be adjusted to its highest while not saturating the data or very few data points saturation, during the thermal transient. High resolution of temperature is required in order to resolve the slight temperature differences when the defect is deep within the sample 102. However, at this temperature resolution and a 12-bit dynamic signal range, or 4095, the maximum temperature difference covered by the camera 106 is 0.015× 4095=61.4° C. In practice, the usable temperature range is much smaller than this maximum. In addition, we observed that the surface temperature jump is typically greater than 100° C. during the thermal flash period, so some data saturation is inevitable.

The experimental surface temperature data are represented by a 2-dimensional array of 256×256 pixels, taken at times t1, t2, ... tN, where tN is greater than or equal to $4t_{1/2}$.

Test and sample parameters, such as sample thickness L and the like, are read as indicated in a block 404. A pixel (i,j) loop starts as indicated in a block 406. The 2-dimensional array of 256×256 pixel data are analyzed one pixel at a time by fitting the pixel's temperature/time curve with a theoretical expression, equation 2 or equation 5. The computer program takes the thermal diffusivity a and a thickness L, typically the sample thickness as inputs and uses the inputted thickness as the initial guess. The pixel thickness is initialized to I=L as indicated in a block 408. The theoretical curve is constructed and then the theoretical curve is fit with an experimental curve and a new pixel thickness I is predicted as indicated in a block 410. Equation 2 is used first to fit the current pixel's temperature/time curve. The saturated data points are not used in the fitting. As the iteration proceeds, the programs settles on either equation 2 or equation 5, depending on the updated thickness used in the equations, and will provide the best fit amplitude and thickness for this pixel. Checking for predicted I converge is performed as indicated in a decision block 412. If not, then the sequential operations return to block 410. This process continues until the data in all pixels are analyzed when the loop has ended as indicated in a decision block 414. The predicted thicknesses are compiled into a 2-dimensional array of 256×256 pixels, in the order of the original arrays for the temperature data and depth map is constructed as indicated in a block 416. This completes the sequential operations as indicated in a block 418.

The accuracy of thickness prediction in the current method is not affected by uneven surface heating during the experiment, because the data analysis is done one pixel at a time and the temperature amplitude is explicitly calculated. The sample may also have varying thickness. In fact, the sample thickness is also explicitly predicted from this method. Lateral heat transfer generated due to thickness variation does not affect the predicted defect depth but does have a slight influence on predicted lateral dimensions where an abrupt thickness change occurs.

Experimental data has shown that the accuracy of the predicted defect depth is very good, and the variation of sample thickness is also accurately shown in the thickness image.

While the present invention has been described with reference to the details of the embodiments of the invention shown in the drawing, these details are not intended to limit the scope of the invention as claimed in the appended claims.

What is claimed is:

1. Apparatus for determining the thickness of a sample and defect depth using thermal imaging in a variety of plastic, ceramic, metal and other products comprising:
   a pair of flash lamps positioned at a first side of the sample;
   an infrared camera positioned near said first side of the sample;
   a data acquisition and processing computer; said data acquisition and processing computer coupled to said flash lamps for triggering said flash lamps, said data acquisition and processing computer coupled to said infrared camera for acquiring and processing thermal image data; said data acquisition and processing computer processing said thermal image data using a theoretical solution to analyze said thermal image data and using a first analytical equation represented by:

$$T(t) = \left\{1 + 2\sum_{n=1}^{\infty} \exp((-n^2\pi^2/L^2)\alpha t)\right\}$$

where $\alpha$ represents a thermal diffusivity for the sample and L represents a sample thickness value; and
   using a second analytical equation represented by:

$$T(t) = \left\{1 + 2\sum_{n=1}^{\infty} \exp((-n^2\pi^2/l^2)\alpha t)\right\} - st$$

where s represents a slope of a linear portion of a temperature/time curve and I represents a defect depth; said thermal image data being analyzed by curve fitting with said first analytical equation and said second analytical equation.

2. Apparatus for determining the thickness of a sample and defect depth using thermal imaging as recited in claim 1 includes a power supply coupled between said flash lamp and said data acquisition and processing computer.

3. Apparatus for determining the thickness of a sample and defect depth using thermal imaging as recited in claim 1 includes a function generator coupled between said infrared camera and said data acquisition and processing computer for controlling said infrared camera.

4. Apparatus for determining the thickness of a sample and defect depth using thermal imaging as recited in claim 1 wherein said infrared camera includes an array of infrared sensors.

5. Apparatus for determining the thickness of a sample and defect depth using thermal imaging as recited in claim 4 wherein said infrared camera array of infrared sensors includes 256×256 focal plane array of infrared sensors.

6. Apparatus for determining the thickness of a sample and defect depth using thermal imaging as recited in claim 5 wherein said data acquisition and processing computer processing said thermal image data and said thermal image data are represented by a series of 2-dimensional arrays of 256×256 pixels, taken at time t1, t2, through tN, where tN is greater than or equal to $4t_{1/2}$ where $t_{1/2}$ represents the time when the temperature at the second, opposed surface of the sample reaches half of the maximum temperature.

7. Apparatus for determining the thickness of a sample and defect depth using thermal imaging as recited in claim 1 wherein said data acquisition and processing computer sequentially processes said thermal image data represented by a series of 2-dimensional arrays of 256×256 pixels, one pixel at a time by fitting a time/temperature curve for each pixel with a theoretical expression.

8. Apparatus for determining the thickness of a sample and defect depth using thermal imaging as recited in claim 7 wherein said data acquisition and processing computer further provides a predicted thickness for each said pixel.

9. Apparatus for determining the thickness of a sample and defect depth using thermal imaging as recited in claim 8 wherein said data acquisition and processing computer further compiles said predicted thickness for each said pixel into a 2-dimensional array of 256×256 pixels.

10. A method for determining the thickness of a sample and defect depth using thermal imaging in a variety of plastic, ceramic, metal and other products comprising the steps of:

providing a pair of flash lamps positioned at a first side of the sample;

providing an infrared camera positioned near said first side of the sample;

utilizing a data acquisition and processing computer for performing the steps of;

triggering said flash lamp, acquiring and processing thermal image data from said infrared camera;

processing said thermal image data using a theoretical solution to analyze said thermal image data to determine the sample thickness and defect depth using a first analytical equation represented by:

$$T(t) = \left\{1 + 2\sum_{n=1}^{\infty} \exp((-n^2\pi^2/l^2)\alpha t)\right\}$$

where $\alpha$ represents a thermal diffusivity for the sample and L represents a sample thickness value; and using a second analytical equation represented by:

$$T(t) = \left\{1 + 2\sum_{n=1}^{\infty} \exp((-n^2\pi^2/l^2)\alpha t)\right\} - st$$

where s represents a slope of a linear portion of a temperature/time curve and l represents a defect depth; said thermal image data being analyzed by curve fitting with said first analytical equation and said second analytical equation.

11. A method for determining the thickness of a sample and defect depth using thermal imaging as recited in claim 10 wherein the step of acquiring and processing image data from said infrared camera includes the step of acquiring image data from an array of 256×256 infrared sensors from said infrared camera.

12. A method for determining the thickness of a sample and defect depth using thermal imaging as recited in claim 11 includes the steps of acquiring a series of said 2-dimensional arrays of 256×256 pixels taken at time t1, t2, through tN, where tN is greater than or equal to $4t_{1/2}$ where $t_{1/2}$ represents the time when the temperature at the second, opposed surface of the sample reaches half of the maximum temperature.

13. A method for determining the thickness of a sample and defect depth using thermal imaging as recited in claim 10 wherein the step of processing said thermal image data includes the step of compiling predicted thicknesses into a 2-dimensional array of 256×256 pixels.

* * * * *